US011117331B2

(12) United States Patent
Il

(10) Patent No.: US 11,117,331 B2
(45) Date of Patent: Sep. 14, 2021

(54) VEHICULAR INTERIOR MEMBER

(71) Applicant: TS TECH CO., LTD., Saitama (JP)

(72) Inventor: Takashige Il, Tochigi (JP)

(73) Assignee: TS TECH CO., LTD., Saitama (JP)

(*) Notice: Subject to any disclaimer, the term of this patent is extended or adjusted under 35 U.S.C. 154(b) by 666 days.

(21) Appl. No.: 15/769,773

(22) PCT Filed: Nov. 2, 2016

(86) PCT No.: PCT/JP2016/082599
§ 371 (c)(1),
(2) Date: Apr. 20, 2018

(87) PCT Pub. No.: WO2017/078066
PCT Pub. Date: May 11, 2017

(65) Prior Publication Data
US 2018/0304544 A1   Oct. 25, 2018

(30) Foreign Application Priority Data

Nov. 4, 2015 (JP) .............................. JP2015-216972

(51) Int. Cl.
*B60R 13/02* (2006.01)
*F16B 5/08* (2006.01)
(Continued)

(52) U.S. Cl.
CPC ........ *B29C 65/607* (2013.01); *B60R 13/0206* (2013.01); *B60R 13/0243* (2013.01);
(Continued)

(58) Field of Classification Search
CPC .......... F16B 5/04; F16B 5/045; F16B 5/0657; F16B 5/08; B60R 13/02; B60R 13/0206; B60R 13/0243

See application file for complete search history.

(56) References Cited

U.S. PATENT DOCUMENTS 6,299,478 B1 * 10/2001 Jones ........................ F16B 2/06
439/571
8,167,347 B2 * 5/2012 Parkinson ........... B60R 13/0243
296/1.08
(Continued)

FOREIGN PATENT DOCUMENTS

JP   2001-322507 A   11/2001
JP   2005-008054 A   1/2005
(Continued)

OTHER PUBLICATIONS

International Search Report dated Jan. 24, 2017 for the corresponding International Application No. PCT/JP2016/082599.

*Primary Examiner* — Michael P Ferguson
(74) *Attorney, Agent, or Firm* — Michael Best & Friedrich LLP

(57) ABSTRACT

The present invention is to provide a vehicular interior member in which three components can be strongly joined to each other and the weight can be reduced. A vehicular interior member is formed so that first and second components respectively made of thermoplastic resin, and a middle component arranged between the first component and the second component are joined to each other. The first component has a boss projecting to the second component side. The middle component has a through hole through which the boss is inserted. The second component has a through hole through which the boss is inserted, and a fitting portion projecting to the middle component side, the fitting portion being fitted to an edge portion of the through hole. The boss and the second component are welded to each other.

14 Claims, 5 Drawing Sheets

(51) Int. Cl.
*B29C 65/60* (2006.01)
*F16B 5/04* (2006.01)
*B29K 101/12* (2006.01)

(52) U.S. Cl.
CPC ............... *F16B 5/045* (2013.01); *F16B 5/08* (2013.01); *B29K 2101/12* (2013.01)

(56) References Cited

U.S. PATENT DOCUMENTS

| | | |
|---|---|---|
| 8,226,871 B2 | 7/2012 | Salvador et al. |
| 8,845,834 B2 * | 9/2014 | Robin .................. B29C 65/607 156/73.1 |
| 9,447,806 B2 * | 9/2016 | Morris .................. F16B 19/002 |
| 9,457,845 B2 * | 10/2016 | Morris .................. B62D 27/02 |
| 2002/0050029 A1 | 5/2002 | Nabeshima |
| 2004/0051221 A1 * | 3/2004 | Sunadome ........... B23Q 16/001 269/47 |
| 2015/0093177 A1 * | 4/2015 | Morris .................. F16B 19/004 403/13 |
| 2015/0375799 A1 * | 12/2015 | Morris .................. F16B 5/0664 403/14 |

FOREIGN PATENT DOCUMENTS

| | | |
|---|---|---|
| JP | 2010-014204 A | 1/2010 |
| JP | 2010-269627 A | 12/2010 |

* cited by examiner

VEHICULAR INTERIOR MEMBER

CROSS-REFERENCE TO RELATED APPLICATIONS

This application is entering into national phase of PCT Application Number PCT/JP2016/082599, filed on Nov. 2, 2016. Further, this application claims the benefit of priority from Japanese Application Number 2015-216972, filed on Nov. 4, 2015, the contents of which are incorporated herein by reference.

TECHNICAL FIELD

The present invention relates to a vehicular interior member in which plural components are joined to each other by welding and fitting.

BACKGROUND ART

As a method of fixing two resin components, a projection provided in one of the resin components is inserted through the other resin component and the projection is fixed by thermal welding (refer to Patent Literature 1 below).

CITATION LIST

Patent Literature

PATENT LITERATURE 1: U.S. Pat. No. 8,226,871

SUMMARY OF INVENTION

Technical Problem

In a case where three resin components are to be fixed to each other, it is thought to arrange a resin component in the middle of upper and lower resin components and nip and fix the middle resin component by thermally welding the upper and lower resin components. However, with such a fixing method, when the group of the fixed resin components is strongly shaken, a position of the non-welded middle resin component is displaced to be a cause of generation of backlash and noises.

Meanwhile, it is thought to fix three components to each other by using tapping screws. However, since the number of parts is increased, the weight and the man-hour are inevitably increased.

The present invention is achieved in consideration with the above problem, and an object of the present invention is to provide a vehicular interior member in which three components can be strongly joined to each other and the weight can be reduced.

Solution to Problem

The above problem is solved by a vehicular interior member in which first and second components respectively made of thermoplastic resin, and a middle component arranged between the first component and the second component are joined to each other, wherein the first component has a first projection portion projecting to the second component side, the middle component has a first through hole through which the first projection portion is inserted, the second component has a second through hole through which the first projection portion is inserted, and a fitting portion projecting to the middle component side, the fitting portion being fitted to an edge portion of the first through hole, and the first projection portion and the second component are welded to each other.

With the above vehicular interior member, by joining the first component and the second component to each other by welding and by fitting the second component and the middle component to each other, the three components can be strongly joined to each other.

Since no other members are required for joining the components forming the vehicular interior member, the number of parts required for joining can be reduced, so that the weight can be reduced.

In comparison to a case where other members such as tapping screws are used for joining the components forming the vehicular interior member, the man-hour of a joining task of the components can also be reduced.

Since a material of joined parts of the components forming the vehicular interior member is resin, a recycling property is also excellent.

In the above vehicular interior member, a first slit portion may be provided on a side surface of the fitting portion, and a claw portion to be fitted to the first slit portion may be provided in the edge portion of the first through hole.

With this, the strength of joining the second component and the middle component can be improved by claw fitting.

In the above vehicular interior member, plural second slit portions may be provided in the edge portion of the first through hole, and in the edge portion of the first through hole, a portion between the plural second slit portions may serve as the claw portion.

With this, the claw portion to be fitted to the second component can be formed in the edge portion of the first through hole by a simple configuration.

In the above vehicular interior member, an inclination portion inclined toward the center of the first through hole may be provided in the edge portion of the first through hole.

With this, the fitting portion of the second component is easily fitted into the first through hole part of the middle component. Thereby, the workability of assembling the middle component and the second component is improved.

In the above vehicular interior member, the fitting portion may be formed in a tubular shape.

With this, the rigidity of the fitting portion of the second component to be fitted to the middle component can be enhanced.

In the above vehicular interior member, the first projection portion may be a boss.

With this, the rigidity of the first projection portion projecting to the second component side in the first component, the first projection portion serving as a welded part can be enhanced. The shape of a welding mass at the time of welding can be stabilized.

In the above vehicular interior member, the first component may have a wall portion provided in a periphery of the first projection portion, the wall portion extending to the second component side, and the fitting portion may be arranged between the first projection portion and the wall portion.

With this, the vehicular interior member can be downsized. Displacement between the first component and the second component can be suppressed, and the rigidity of a point where the first component and the second component are joined to each other can be enhanced.

In the above vehicular interior member, the wall portion may be abutted with the middle component.

With this, movement of the middle component in the up and down direction (projecting direction of the first projection portion) can be restricted. Thereby, generation of backlash in the components of the vehicular interior member can be suppressed.

The vehicular interior member may have a rib coupled to a lower portion of the first projection portion and a lower portion of the wall portion, respectively.

With this, the rigidity of the first projection portion and the wall portion can be enhanced.

In the above vehicular interior member, the wall portion may be an annular standing wall.

With this, the rigidity of the wall portion provided in the first component can be enhanced.

Advantageous Effects of Invention

According to the present invention, the three components forming the vehicular interior member can be strongly fixed to each other and the weight can be reduced.

According to an aspect of the present invention, the strength of joining the second component and the middle component can be improved by claw fitting.

According to an aspect of the present invention, the claw portion to be fitted to the second component can be formed in the edge portion of the first through hole by a simple configuration.

According to an aspect of the present invention, the workability of assembling the middle component and the second component can be improved.

According to an aspect of the present invention, the rigidity of the fitting portion of the second component to be fitted to the middle component can be enhanced.

According to an aspect of the present invention, the rigidity of the first projection portion projecting to the second component side in the first component, the first projection portion serving as the welded part can be enhanced.

According to an aspect of the present invention, the vehicular interior member can be downsized.

According to an aspect of the present invention, the movement of the middle component in the up and down direction (projecting direction of the first projection portion) can be restricted.

According to an aspect of the present invention, the rigidity of the first projection portion and the wall portion can be enhanced.

According to an aspect of the present invention, the rigidity of the wall portion provided in the first component can be enhanced.

DESCRIPTION OF EMBODIMENTS

Hereinafter, an embodiment of a vehicular interior member according to the present invention (referred to as the embodiment) will be described based on FIGS. 1 to 7.

The present embodiment relates to the invention of a vehicular interior member in which first and second components respectively made of thermoplastic resin, and a middle component arranged between the first component and the second component are joined to each other, wherein the first component has a first projection portion projecting to the second component side, the middle component has a first through hole through which the first projection portion is inserted, the second component has a second through hole through which the first projection portion is inserted, and a fitting portion projecting to the middle component side, the fitting portion being fitted to the first through hole, and the first projection portion and the second component are welded to each other.

For example, the vehicular interior member according to the present invention can be applied to an interior member such as a door lining of a vehicle and a pad of an armrest.

Figure 1:
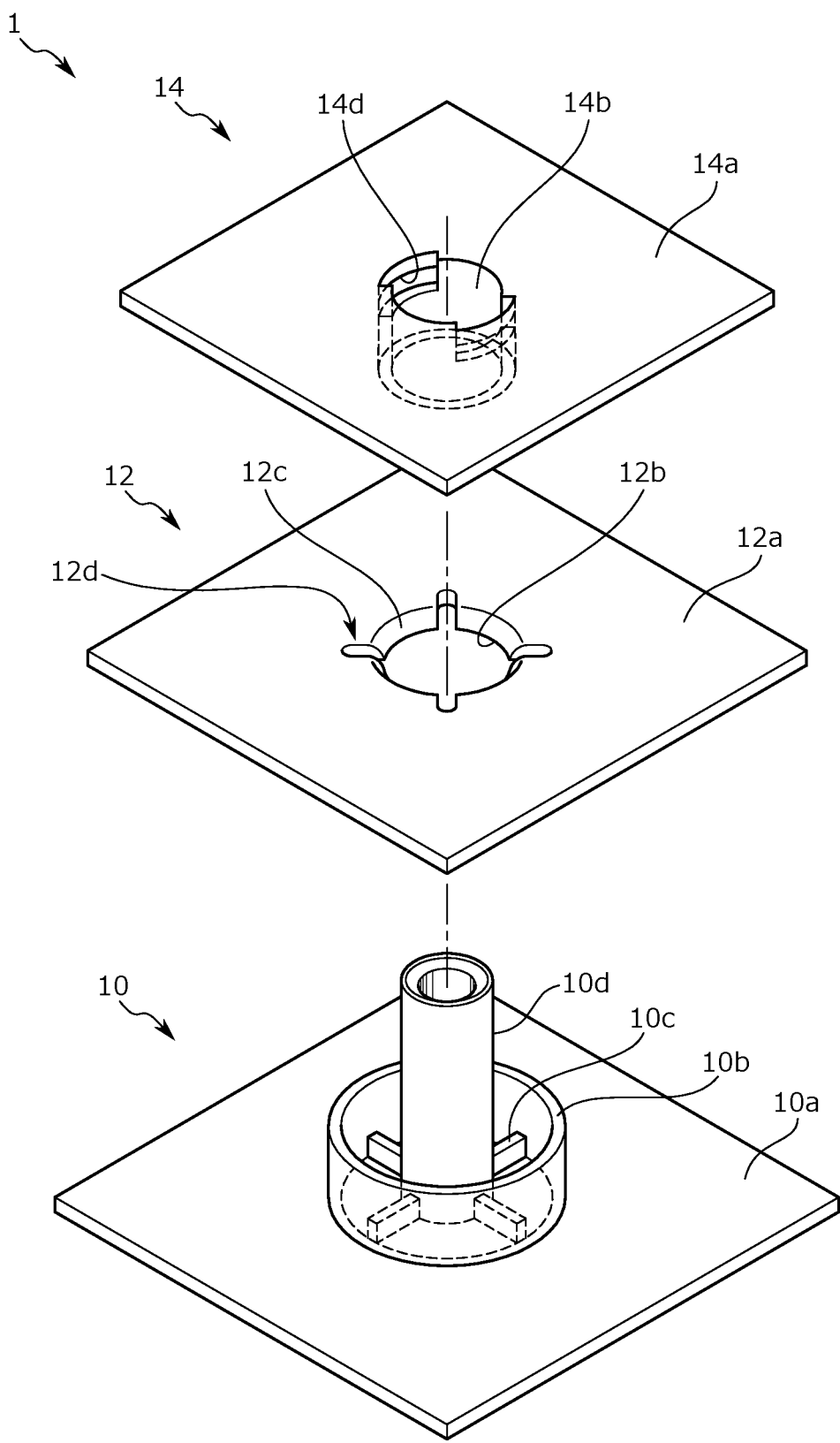
FIG. 1 is an exploded perspective view of a vehicular interior member according to the present embodiment.
Figure 2:
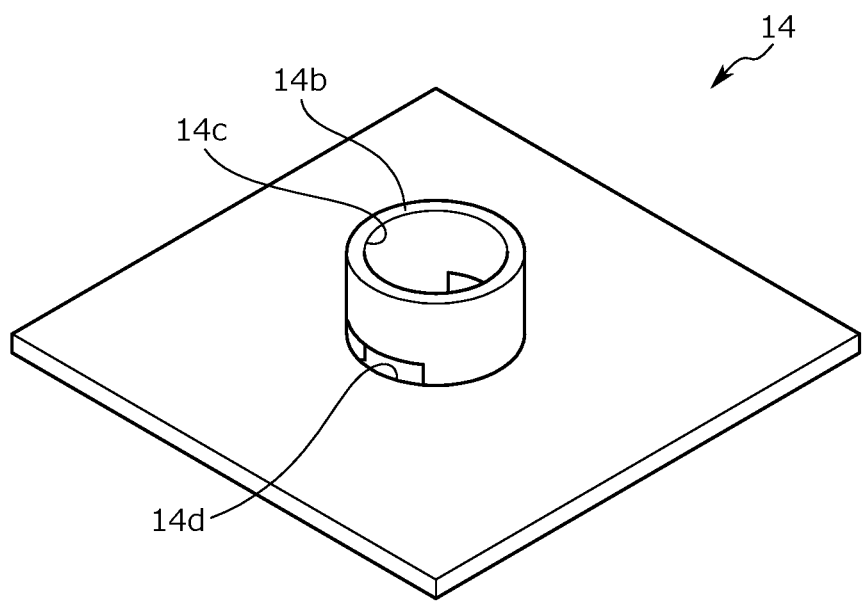
FIG. 2 is a perspective view of a back surface of a second component.
Figure 3:
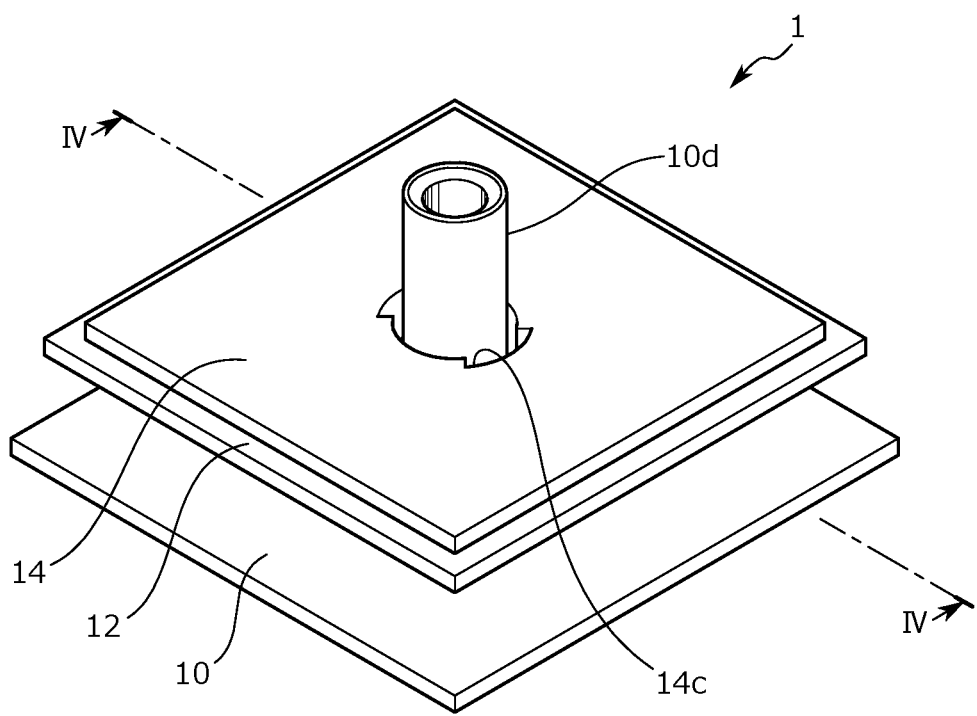
FIG. 3 is a perspective view of the vehicular interior member according to the present embodiment.
Figure 4:
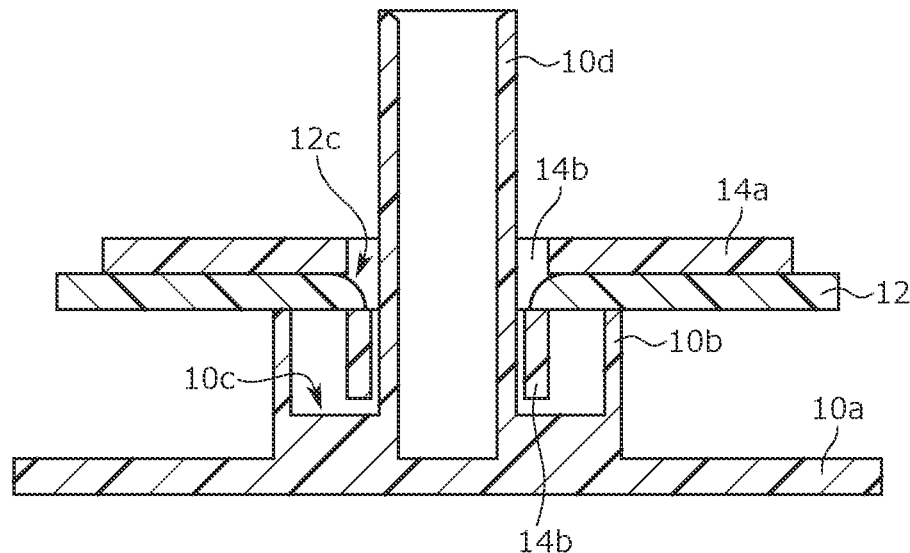
FIG. 4 is a sectional view taken along the line IV-IV of FIG. 3.
Figure 5:
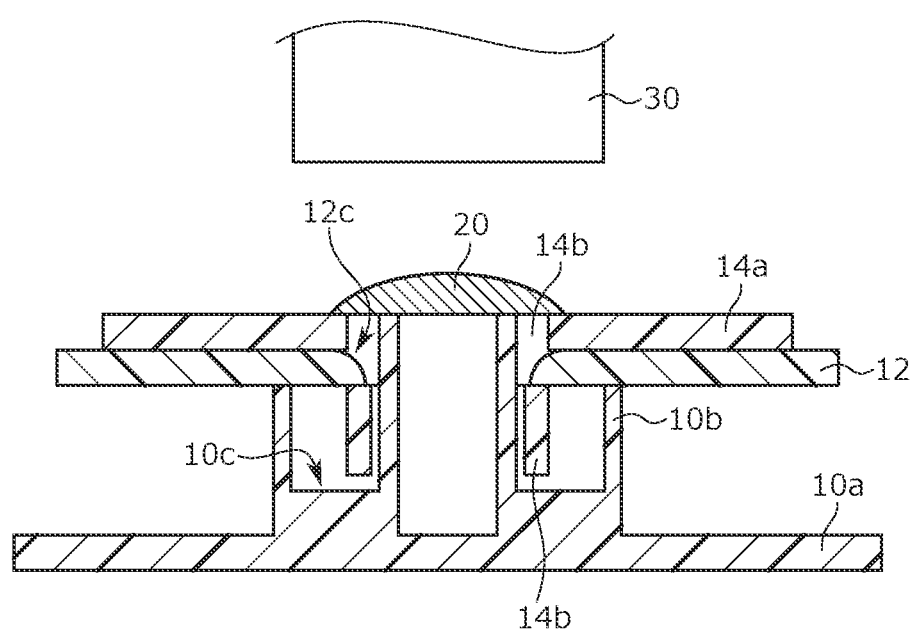
FIG. 5 is a sectional view taken along the line IV-IV after thermal welding.

FIG. 1 is an exploded perspective view of a vehicular interior member 1 according to the present embodiment. FIG. 2 is a perspective view of a back surface of a second component 14. FIG. 3 is a perspective view of the vehicular interior member 1. FIG. 4 is a sectional view taken along the line IV-IV of FIG. 3. FIG. 5 is a sectional view taken along the line IV-IV after the vehicular interior member 1 is joined by thermal welding.

As shown in FIGS. 1 to 4, the vehicular interior member 1 is formed by including a first component 10, a middle component 12, and the second component 14. In a case where the vehicular interior member 1 is a door lining, for example, the first component 10 may correspond to an accessory board (door lining body), and the second component 14 (or the middle component 12) may correspond to a backing board.

The first component 10 is a resin component made of thermoplastic resin, and a wall portion 10$b$, a rib 10$c$, and a boss 10$d$ are formed on a surface portion 10$a$ formed in a flat plate.

As shown in FIG. 1, the wall portion 10$b$ is an annular standing wall arranged around the boss 10$d$. The wall portion 10$b$ extends upward (that is, toward the side where the second component 14 is arranged) from the surface portion 10$a$. As shown in FIG. 4, in a case where the middle component 12 is mounted on the first component 10, the wall portion 10$b$ serves as a part abutted with a back surface of the middle component 12.

In such a way, by abutting the wall portion 10$b$ with the back surface of the middle component 12, movement of the middle component 12 in the up and down direction can be restricted. By supporting the middle component 12 by the wall portion 10$b$, a gap is produced between the surface portion 10$a$ and the back surface of the middle component 12. Thereby, an effect of effectively releasing heat transmitted from the boss 10$d$ which is heated at the time of thermal welding is also exerted.

As shown in FIG. 1, the boss 10$d$ is a cylindrical projection portion projecting upward (toward the side where the second component 14 is arranged) from the surface portion 10$a$. An opening in a center portion of the boss 10$d$ is provided by inserting in and taking out a sleeve pin to and from the center portion. The center axis of the wall portion 10$b$ and the center axis of the boss 10$d$ may be identical.

As shown in FIG. 1, a lower portion of the boss 10d and a lower portion of the wall portion 10b are coupled to each other by the rib 10c provided on the surface portion 10a. The rib 10c extends in the in-plane direction (crisscross direction) of the surface portion 10a from a connection portion between the boss 10d and the surface portion 10a.

Next, a configuration of the middle component 12 will be described. As shown in FIG. 1, the middle component 12 has a through hole 12b provided in a center portion of a surface portion 12a formed in a flat plate, claw portions 12c provided in an edge portion of the through hole 12b, and slit portions 12d provided on both the sides of the claw portions 12c. The middle component 12 may be molded with thermoplastic resin, or may be molded with other materials such as thermosetting resin and metal.

The through hole 12b is a substantially circular opening through which both the boss 10d of the first component 10 and a fitting portion 14b of the second component 14 are inserted. The diameter of the through hole 12b is the substantially same as the outer diameter of the fitting portion 14b (or the outer diameter of the fitting portion 14b is slightly larger).

The edge portion of the through hole 12b is inclined toward the inside (that is, toward the center of the through hole 12b) from the outside, so that the fitting portion 14b of the second component 14 is easily inserted. For example, the diameter on the outside of the edge portion of the through hole 12b may be larger than the outer diameter of the fitting portion 14b, and the diameter on the inside of the edge portion of the through hole 12b may be smaller than the outer diameter of the fitting portion 14b.

In the edge portion of the through hole 12b, the slit portions 12d are provided at four points in the diagonal directions of the middle component 12. In the edge portion of the through hole 12b, at least one of portions partitioned by the slit portions 12d functions as the claw portion 12c to be fitted to a through hole 14c of the fitting portion 14b.

In the present embodiment, in the edge portion of the through hole 12b, opposing two portions among the portions partitioned by the slit portions 12d serve as the claw portions 12c to be fitted to the through hole 14c of the fitting portion 14b. However, the present invention is not limited to this but in the edge portion of the through hole 12b, one or three or more portions partitioned by the slit portions 12d may function as the claw portions 12c.

Next, a configuration of the second component 14 will be described. The second component 14 is a resin component made of thermoplastic resin, and has the fitting portion 14b provided in a center portion of a surface portion 14a formed in a flat plate. As shown in FIG. 1, the fitting portion 14b is a part extending downward (toward the side where the first component 10 is arranged) from the opposite side (back surface side) of the surface portion 14a.

As shown in FIGS. 1 and 2, the fitting portion 14b is formed in a substantially tubular shape, and the through hole 14c is provided in a center portion of the fitting portion 14b.

The through hole 14c is a substantially circular opening through which the boss 10d of the first component 10 is inserted. That is, the diameter of the through hole 14c is larger than the outer diameter of the boss 10d.

As shown in FIGS. 1 and 2, slit portions 14d are provided from the surface portion 14a to part of a side surface of the fitting portion 14b. When the fitting portion 14b of the second component 14 is pushed into the through hole 12b of the middle component 12, the claw portions 12c of the middle component 12 are fitted into the slit portions 14d. In such a way, by strongly joining the middle component 12 and the second component 14 by claw fitting, movement of the middle component 12 in the up and down direction and the right and left direction with respect to the second component 14 is restricted.

As shown in FIG. 4, in a state where the first component 10, the middle component 12, and the second component 14 are assembled, the fitting portion 14b is arranged between the boss 10d of the first component 10 and the wall portion 10b. With this, the vehicular interior member 1 can be downsized and generation of displacement of the components of the vehicular interior member 1 can be suppressed.

FIG. 5 shows a state where a heated welding horn 30 is pressed onto the boss 10d projecting from the through hole 14c from the upper side and the boss is welded, and at a part of a welding mass 20, the first component 10 and the second component 14 are joined to each other by welding. The welding mass 20 is made by melting together and solidifying a material in which the first component 10 and the second component 14 are melted. The second component 14 and the middle component 12 are fixed to each other by fitting the claw portions 12c of the middle component 12 to the through hole 14c of the second component 14. Thereby, the first component 10, the middle component 12, and the second component 14 forming the vehicular interior member 1 are strongly joined all together.

The diameter of the boss 10d may be determined so that the boss 10d is arranged on the inner side of an end surface of the welding horn 30 in order to abut the end surface of the welding horn 30 with the boss 10d.

In the vehicular interior member 1 according to the present embodiment described above, among the first component 10, the middle component 12, and the second component 14 forming the vehicular interior member 1, the first and second components 10, 14 arranged in the up and down direction are fixed by welding, and the middle component 12 arranged between the first component 10 and the second component 14 and the second component 14 are fixed to each other by claw fitting. Thereby, the components can be strongly fixed to each other, so that generation of backlash can be suppressed. Since no other members such as tapping screws are required for fixing the components, the number of parts required for fixing can be reduced, so that the weight can be reduced. In comparison to a case where tapping screws are used for fixing the components, the man-hour of a fixing task of the components can also be reduced. Since a material of joined parts of the components forming the vehicular interior member 1 is resin, a recycling property is also excellent.

The present invention is not limited to the above embodiment. For example, the first projection portion provided in the first component 10 is not limited to the boss 10d but may be a rib (such as a cross shaped rib) as long as the rib is inserted through the through hole 14c of the fitting portion 14b.

In the above embodiment, the welding horn 30 is pushed onto the boss 10d and the boss is welded. However, the boss may be welded by using an iron.

A length of the boss 10d projecting from the through hole 14c of the second component 14 (that is, a length of apart serving as a welded part) may be adjusted in conjunction with the joining strength. For example, in a case where stronger joining is required, the length of the boss 10d projecting from the through hole 14c of the second component 14 may be extended.

Figure 6:
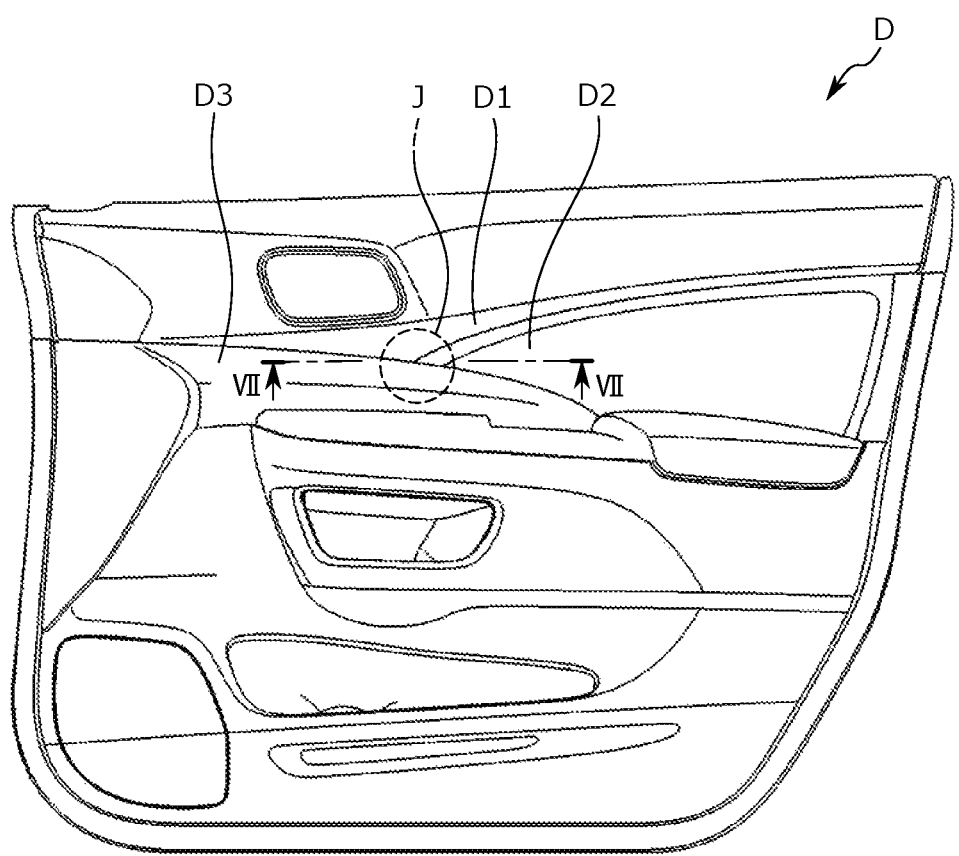
FIG. 6 is an example of a vehicular door to which the vehicular interior member is applied.
Figure 7:
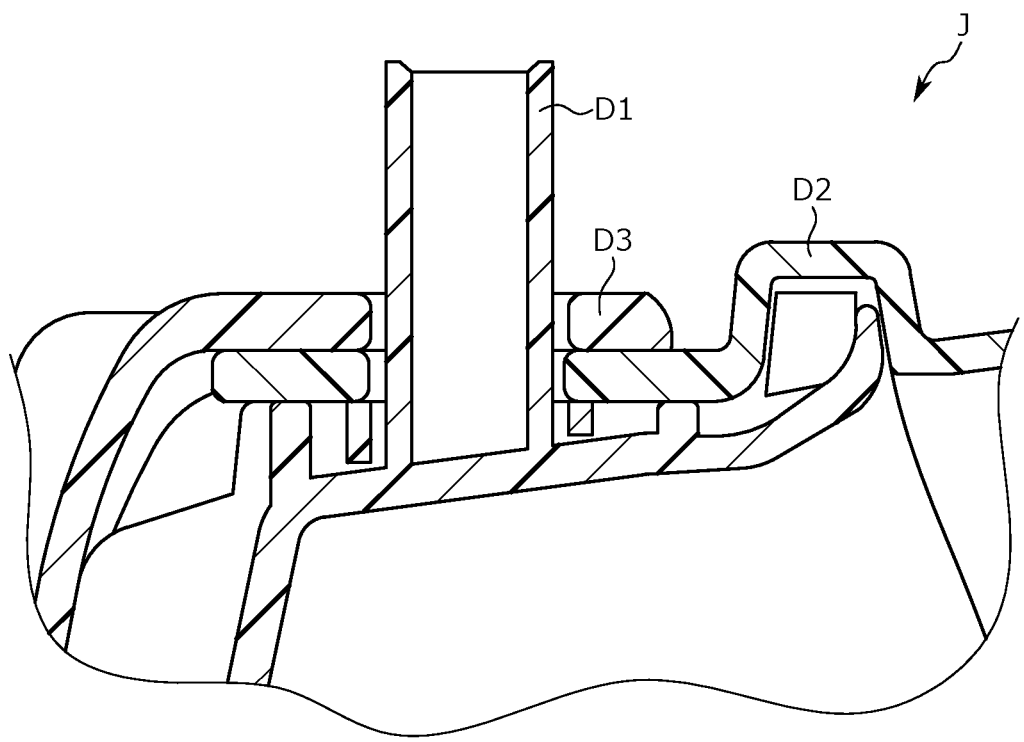
FIG. 7 is a sectional view taken along the line VII-VII of FIG. 6.

FIG. 6 shows an example of a vehicular door D to which the vehicular interior member according to the present invention is applied. FIG. 7 shows a sectional view taken along the line VII-VII of a joined part J of a first door component D1, a second door component D2, and a third door component D3 forming the vehicular door D.

The first door component D1 is, for example, a door trim upper member serving as an interior component of the vehicular door D, and corresponds to the first component 10 in the above vehicular interior member 1. The second door component D2 is, for example, a door trim ornament member serving as an interior component of the vehicular door D, and corresponds to the middle component 12 in the above vehicular interior member 1. The third door component D3 is, for example, a door trim lower member serving as an interior component of the vehicular door D, and corresponds to the second component 14 in the above vehicular interior member 1.

As shown in FIG. 7, by joining the second door component D2 and the third door component D3 by claw fitting and joining the first door component D1 and the third door component D3 by thermally welding a projection portion of the first door component D1 projecting from a through hole of the third door component D3, the components can be strongly joined to each other.

In such a way, by applying the joining structure of the vehicular interior member according to the present invention to the components forming the vehicular door D, the three components can be strongly fixed by thermal welding and fixing. The example in which the structure of the vehicular interior member of the present invention is applied to the vehicular door D is described above. However, the present invention is not limited to this but can also be applied to other joining of three components as a matter of course.

In the above embodiment, the example in which the method of thermal welding by the welding horn is used for welding is described. However, other welding methods such as ultrasonic welding, vibration welding, induction welding, high frequency welding, semiconductor laser welding, and spin welding may be used.

REFERENCE SIGNS LIST

1: Vehicular interior member
10: First component
   10*a*: Surface portion
   10*b*: Wall portion
   10*c*: Rib
   10*d*: Boss
12: Middle component
   12*a*: Surface portion
   12*b*: Through hole
   12*c*: Claw portion
   12*d*: Slit portion
14: Second component
   14*a*: Surface portion
   14*b*: Fitting portion
      14*c*: Through hole
      14*d*: Slit portion
20: Welding mass
30: Welding horn
D: Vehicular door
   D1: First door component
   D2: Second door component
   D3: Third door component
J: Joined part

What is claimed is:

1. A vehicular interior member comprising:
a first component and a second component respectively made of thermoplastic resin, and a middle component arranged between the first component and the second component, wherein the first component, the second component, and the middle component comprise flat plate portions which are joined substantially parallel to each other, wherein:
the first component has a first projection portion projecting to a second component side thereof,
the middle component has a first through hole through which the first projection portion is inserted,
the second component has:
a second through hole through which the first projection portion is inserted, and
an annular fitting portion surrounding the second through hole that projects to a first component side of the second component, and is inserted into and penetrates the first through hole of the middle component with the first projection portion extending therethrough, wherein a side surface of the fitting portion interlockably engages with an engagement element extending from an edge portion of the first through hole, and
the first projection portion is welded to the second component on a side thereof opposite the first component side.

2. The vehicular interior member according to claim 1, wherein
the fitting portion is formed in a tubular shape.

3. The vehicular interior member according to claim 1, wherein
the first projection portion is a boss.

4. The vehicular interior member according to claim 1, wherein:
the first component has a wall portion provided around a periphery of the first projection portion, the wall portion extending from a side facing the middle component to the second component side, and
the fitting portion is arranged between the first projection portion and the wall portion.

5. The vehicular interior member according to claim 4, wherein
the wall portion is abutted with the middle component.

6. The vehicular interior member according to claim 4, further comprising:
a rib coupled to a lower portion of the first projection portion and a lower portion of the wall portion, respectively.

7. The vehicular interior member according to claim 4, wherein
the wall portion is an annular standing wall.

8. The vehicular interior member according to claim 1, wherein
the first component has a wall portion that is provided around a periphery of the first projection portion and that extends to the second component side, and
the wall portion is arranged at a position that does not overlap the fitting portion in a direction perpendicular to a projecting direction of the first projection portion.

9. The vehicular interior member according to claim 8, wherein
a thickness of the fitting portion is greater than a thickness of the wall portion.

10. The vehicular interior member according to claim 1, wherein
the vehicular interior member is a door lining of a vehicle.

11. A vehicular interior member comprising:
a first component and a second component respectively made of thermoplastic resin, and a middle component arranged between the first component and the second component, wherein the first component, the second component, and the middle component comprise flat plate portions which are joined substantially parallel to each other, wherein:

the first component has a first projection portion projecting to a second component side thereof, the middle component has a first through hole through which the first projection portion is inserted, the second component has:

a second through hole through which the first projection portion is inserted, and an annular fitting portion surrounding the second through hole that projects to a first component side of the second component, and is inserted into and penetrates the first through hole of the middle component with the first projection portion extending therethrough, the first projection portion is welded to the second component on a side thereof opposite the first component side, a first slit portion is provided on a side surface of the fitting portion, and a claw portion extends from an edge portion of the first through hole, wherein the claw portion interlockably engages with the first slit portion.

12. The vehicular interior member according to claim 11, wherein:

plural second slit portions are provided in the edge portion of the first through hole, and in the edge portion of the first through hole, a portion between the plural second slit portions serves as the claw portion.

13. The vehicular interior member according to claim 11, wherein an inclination portion inclined toward the center of the first through hole is provided in the edge portion of the first through hole.

14. A method for manufacturing a vehicular interior member including a first component and a second component respectively made of thermoplastic resin, and a middle component arranged between the first component and the second component, wherein the first component, the second component, and the middle component comprise flat plate portions which are joined substantially parallel to each other, comprising:

providing the first component with a first projection portion projecting to a second component side thereof, providing the middle component with a first through hole, providing the second component with a second through hole and an annular fitting portion surrounding the second through hole that projects to a first component side of the second component, inserting the first projection portion into the first through hole of the middle component, inserting the first projection portion into the second through hole of the second component, inserting the fitting portion into the first through hole of the middle component to penetrate the first through hole with the first projection portion extending therethrough, wherein a side surface of the fitting portion interlockably engages with an engagement element extending from an edge portion of the first through hole, and welding a portion of the first projecting portion that projects from the second through hole of the second component to the second component on a side thereof opposite the first component side to join the first component and the second component by welding.

* * * * *